United States Patent [19]

Lederer et al.

[11] 4,088,712

[45] May 9, 1978

[54] PROCESS FOR PREPARING IMPACT RESISTANT POLYVINYL AROMATICS

[75] Inventors: Michael Lederer, Königstein, Taunus; Wolfgang Strobel, Hofheim, Taunus, both of Germany

[73] Assignee: Hoechst Aktiengesellschaft, Frankfurt am Main, Germany

[21] Appl. No.: 713,886

[22] Filed: Aug. 12, 1976

[30] Foreign Application Priority Data

Aug. 14, 1975 Germany ............................ 2536262

[51] Int. Cl.$^2$ .......................... C08F 4/28; C08F 4/34; C08F 255/06
[52] U.S. Cl. ................................................ 260/878 R
[58] Field of Search .................................... 260/878 R

[56] References Cited

U.S. PATENT DOCUMENTS

| | | | |
|---|---|---|---|
| 3,515,774 | 6/1970 | Lee | 260/878 R |
| 3,886,233 | 5/1975 | Visseren | 260/878 R |
| 3,893,968 | 7/1975 | Shiga et al. | 260/878 R |
| 3,927,142 | 12/1975 | Strobel | 260/878 R |

OTHER PUBLICATIONS

Chemical Abstracts, 84, 18338k (1976).

*Primary Examiner*—Alan Holler
*Attorney, Agent, or Firm*—Curtis, Morris & Safford

[57] ABSTRACT

There is disclosed an improved bulk-suspension process for polymerizing vinyl aromatic monomers in the presence of an ethylene-propylene-nonconjugated diene-rubber, which comprises using, in the suspension polymerization step, peroxy-carbonic esters as the polymerization initiator. The process of the invention yields products having improved notched impact strength, weatherability and elongation at break combined with a good shear stability.

4 Claims, No Drawings

PROCESS FOR PREPARING IMPACT RESISTANT POLYVINYL AROMATICS

It is known that impact resistant polystyrene may be prepared according to the mass-suspension process, wherein ethylene propylene tercomponent rubber (EPTR) acts as elastomer component (cf. German Offenlegungsschrift No. 1,745,945, German Auslegeschrift No. 1,247,021 and German Offenlegungsschrift No. 1,645,683). In this process products are obtained, wherein the elastomer phase is dispersed in the polystyrene matrix in the form of particles of from 10 to 20 μ. These products only have a moderate notched impact strength. It has been proposed to use small quantities of a polybutadiene having a 1,2-vinyl structure additionally to EPTR (cf. German Offenlegungsschrift No. 2,048,557). Products prepared according to this process still contain unsaturated portions initiating decomposition of the polymer on weathering and unfavorably affecting the toughness and the elastic properties.

It has moreover been proposed (cf. British No. 879,907, German Auslegeschrift No. 1,252,901, U.S. Pat. No. 3,632,675) to treat the solution of an elastomer component with oxygen prior to polymerization, to isolate the autoxidized rubber and to carry out the graft copolymerization with an alkenyl aromatic compound subsequently. These processes require a high technical expenditure and additional processing steps and are therefore economically uninteresting.

It is further known that polymerizations in the presence of free radical catalysts are considerably impeded by oxygen. The thermally initiated graft copolymerization of styrene on polybutadiene in the presence of atmospheric oxygen is impeded by the factor 2 to 3. Polymerizations are therefore carried out in the absence of oxygen.

There has also been proposed a process for the manufacture of impact resistant vinyl aromatic graft copolymers having an improved notched impact strength and resistance to atmospheric corrosion by polymerization of a vinyl aromatic monomer or of a mixture of vinyl aromatic monomers in the presence of an ethylene-propylene-tercomponent rubber according to a two-step mass suspension process, which comprises carrying out the mass polymerization of the first step in the presence of oxygen, preferably in the presence of air, at a pressure of from 0,05 to 10 atmospheres gauge, preferably of from 0,1 to 3 atmospheres gauge.

Surprisingly, it has now been found that shear resistant products with good toughness and elastic properties and with clearly improved values of elongation at break are obtained by carrying out the suspension polymerization in the second step in the presence of peroxy carboxylic acid esters having the formula

wherein $R_1$ represents a straight-chain or branched alkyl radical having from 6 to 20 carbon atoms, preferably from 6 to 10 carbon atoms, or an alkenyl radical having from 6 to 20 carbon atoms, preferably from 6 to 10 carbon atoms, or an aralkyl radical with from 7 to 12 carbon atoms or a cycloalkyl radical with from 5 to 10 carbon atoms, optionally carrying alkyl substituents, preferably a cyclohexyl radical, and $R_2$ represents an alkyl radical with from 4 to 12 carbon atoms, preferably from 4 to 8 carbon atoms, especially a t-butyl radical, or an aralkyl radical with from 7 to 12 carbon atoms, preferably a cumyl radical.

A process has now been found for preparing impact resistant vinyl aromatic graft copolymers having an improved notched impact strength and resistance to atmospheric corrosion by polymerizing a monomer vinyl aromatic compound or a mixture of vinyl aromatic compounds in the presence of an ethylene propylene tercomponent rubber according to a two-step mass suspension process, the mass polymerization of the first step being carried out in the presence of oxygen, preferably in the presence of air, at a pressure of from 0.05 to 10 atmospheres gauge, preferably of from 0.1 to 3 atmospheres gauge, which comprises carrying out the suspension polymerization of the second step in the presence of peroxy carboxylic acid esters having the formula

wherein $R_1$ represents a straight-chain or branched alkyl radical with from 6 to 20 carbon atoms, preferably from 6 to 10 carbon atoms, or an alkenyl radical having from 6 to 20 carbon atoms, preferably from 6 to 10 carbon atoms, or an aralkenyl radical with from 7 to 12 carbon atoms or a cycloalkyl radical with from 5 to 10 carbon atoms, optionally carrying alkyl substituents, preferably a cyclohexyl radical, and $R_2$ represents an alkyl radical with from 4 to 12 carbon atoms, preferably from 4 to 8 carbon atoms, especially a t-butyl radical, or an aralkyl radical with from 7 to 12 carbon atoms, preferably a cumyl radical.

The peroxy carboxylic acid esters of formula 1 are utilized in an amount of from 0.0002 to 0.46 weight %, preferably from 0.004 to 0.13 weight %, of active oxygen, calculated on the total quantity of monomers.

The following examples may be cited as alkyl or alkenyl radicals $R_1$ in formula 1: n-hexyl radical, n-octyl radical, 2-ethyl-hexyl radical, dodecyl radical, 3,5,5-trimethylhexyl radical, myristyl radical, cetyl radical, octadecyl radical, octene-(1)-yl-(8) radical, 2-methyl-octene-(6)-yl-(5)-radical, 1-vinyl-decyl-radical, oleyl radical. Aralkyl radicals $R_1$ or $R_2$ are e.g.: benzyl radical, phenyl hexyl radical.

The peroxy carboxylic acid esters of formula 1 are prepared as per a reaction according to Schotten-Baumann from chloroformic acid esters

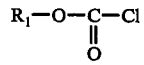

and alkyl- or aralkyl hydroperoxides $R_2$—OOH in the presence of a basic reacting substance. The radicals $R_1$ and $R_2$ have the above specified meaning.

The peroxy carboxylic acid esters of formula 1 may as well be prepared in the polymerization medium - in situ - from the two starting substances having formulae

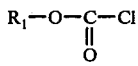

and R$_2$—OOH the ester component being added e.g. dissolved in the pre-polymer and the hydroperoxide being dissolved in the styrene.

There may be cited as basic reacting compounds, e.g.: NaOH, KOH, NaHCO$_3$, Na$_2$HPO$_4$, Na$_3$PO$_4$, pyridine or other organic bases.

Suitable ethylene-propylene-tercomponent rubbers are those which are obtained by polymerization of from 70 to 30 weight % of ethylene, from 70 to 30 weight % of propylene and from 0.5 to 15 weight % - calculated on the quantities of ethylene + propylene - of a diolefine as tercomponent. Diolefines representing suitable tercomponents are those having at least 5 carbon atoms, the double bonds of which are not conjugated, e.g. 5-ethylidene norbornene, dicyclopentadiene, 2,2,1-bicycloheptadiene and 1,4-hexadiene. The EPTR is suitably utilized in an amount of from 1 to 20 weight %, preferably from 4 to 15 weight %.

Suitable vinyl aromatic compounds are styrene or α-methyl styrene as well as their derivatives carrying in the nucleus one or several alkyl groups containing from 1 to 4 carbon atoms. They are added advantageously in an amount of from 80 to 99 % by weight, preferably of from 85 to 96% by weight. It is not necessary to add the whole quantity of the vinyl aromatic monomer in the mass polymerizaton step. A part may be added in the suspension polymerization.

The oxygen is used in pure form, preferably in the form of air. The pre-polymerization (mass polymerization) is effected at a pressure of from 0.05 to 10 atmospheres gauge, preferably of from 0.1 to 3 atmospheres gauge.

As initiators there may be used in the first step (in the mass polymerization)or additionally to the peroxy-carboxylic acid esters of formula 1 in the second step (the suspension polymerization) peroxides such as alkylhydroperoxides, aralkylhyroperoxides, dialklperoxides, diacylperoxides, peroxydicarbonates, peroxyesters, peroxyacetals and peroxyketals. Examples thereof are tertiary butylhydroperoxide, cumenehydroperoxide, 2,5-dimethyl-2,5-bishydroperoxyhexane, 1,3-diisopropylbenzene-dihydroperoxide, ditertiary butyl peroxide, tertiary butyl cumylperoxide, dicumylperoxide, dibenzoylperoxide, dilaurylperoxide, diisopropylperoxydicarbonate, dicylohexylperoxydicarbonate, tertiary butylperoxy-isopropylcarbonate, tertiary butylperoxypivalate, tertiary butylperoxyoctanoate, tertiary butylperoxybenzoate, the addition products of alkylhydroperoxides to aldehydes for example to acetaldehyde and benzaldehyde, to ketones such as acetone methylethylketone and cyclohexanone as well as its substitution products, moreover the addition products of alkylhydroperoxides or H$_2$O$_2$ to N-vinyl compounds such as N-methyl-N-vinyl acetamide, N-vinyl-pyrrolidone, N-vinyl azetidinone-2. The aforesaid peroxides may be used alone, but a mixture of two or several, preferably of 2 or 3, peroxides may also be used.

Instead of peroxides azocompounds may also be used as initiators, for example, azobisisobutyric acid nitrile or azobisisovaleric acid nitrile. Mixtures of azocompounds and peroxides may also be used as initiators.

The initiators are added in an amount of from 0.001 to 5% by weight, preferably of from 0.005 to 2% by weight, calculated on the organic phase.

Antioxidants such as 2,6-ditertiary butyl-p-cresol or trisnonylphenylphosphite may be added to the polymerization starting mixture in an amount of from 0.05 to 1 % by weight, preferably of from 0.1 to 0.6 % by weight, furthermore plasticizers and lubricants, for example, paraffin oils, phthalic acid esters and stearic acid esters in an amount of from 0.2 to 5 % by weight, preferably of from 0.5 to 3.5 % by weight.

Said additives may be added already in the first step (mass pre-polymerization) or/and in the second step (suspension polymerization).

The adding of unsaturated polysiloxanes favorably influences the elastic properties and the notched impact strength of the graft copolymerisates according to the invention.

Suitable polysiloxanes are those containing structural units of the formula

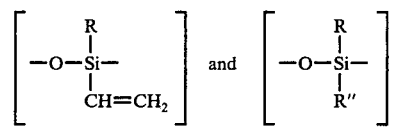

(I) (II)

in a molar ratio of I:II from 1:4 to 1:50 and carrying terminal hydroxy groups and having an average molecular weight of from 1,000 to 5,000. R, R' and R" each signify alkyl radicals having from 1 to 4 carbon atoms, being optionally identical.

The tensile strength and the notched impact strength of the graft copolymerisates are considerably improved by adding the polysiloxane in an amount of from 0.001 to 1 % by weight, preferably of from 0.01 to 0.5 % by weight.

The polymerization to be carried out stepwise is effected in the first step in the form of a mass polymerization in the presence of oxygen. This pre-polymerization is performed at temperatures of from 70° t0 140° C, preferably of from 80° to 130° C, until a conversion of from 25 to 60 %, preferably of from 30 to 50 % , is obtained.

The polymerization of the prepolymerisate (reaction mixture at the end of the first step) is then continued and terminated in the second step after dispersion in an aqueous phase with the addition of peroxy-carboxylic acid ester(s) of formula 1 and optionally of further initiators and in the absence of oxygen at temperatures of from 70° to 150° C, preferably of from 80° to 140° C (suspension polymerization).

Suitable dispersing agents are macromolecular watersoluble substances such as polyvinyl alcohol, polyvinyl pyrrolidone, copolymers of vinyl pyrrolidone with vinyl esters or acrylic or methacrylic acid esters, poly-N-vinyl-N-methyl-acetamide, the copolymers of N-vinyl-N-methylacetamide and acrylic and/or methacrylic acid esters, cellulose derivatives or known inorganic suspending agents such as tricalciumphosphate, Ca-oxalate or barium sulphate. They are added in an amount of from 0.02 to 2% by weight, preferably of from 0.1 to 1 % by weight, calculated on the organic phase.

Said dispersing agents may be combined with small quantities of low molecular or high molecular anionic emulsifiers or wetting agents in an amount of from 0.001 to 0.1 % by weight, preferably of from 0.002 to 0.08 % by weight, calculated on the organic phase.

Moreover, there may be added in the second step, besides the aforesaid initiators, small quantities of water-soluble initiators such as $K_2S_2O_8$, reaction products of $K_2SO_5$ with alkyl- or cycloalkyl-chloroformates or water-soluble azocompounds such as the sodium salt of the axobisisovaleric acid nitrile.

Products having a finely dispersed elastomer phase are obtained according to the process of the invention, which have an improved notched impact strength and resistance to atmospheric corrosion together with a good shear stability (during processing) and strongly improved tensile strength and may be easily processed.

The following examples illustrate the invention.

EXAMPLES 5500 parts by weight of an ethylene-propylene-tercomponent rubber (containing 52.3 weight % of propylene, 6.9 weight % of the tercomponent 5-ethylidene-norbornene-2, RSV being 2.81 dl/g, Mooney-value of ML 4 at 100° C : 63) were dissolved in 36 800 parts by weight of styrene. 1650 parts by weight of paraffin oil (mixture of aliphatic hydrocarbons boiling within the range of from 100° to 300° C C) and 6.8 parts by weight of cumene hydroperoxide (of 80 % concentration) were added. Air was introduced into the autoclave until a pressure of 1 atmosphere gauge was reached and the polymerization was carried out at 120° C up to a solid matter content of 38 %. In the absence of air the prepolymer was dispersed in an aqueous liquor of 66,000 parts by weight of water containing 99 parts by weight of a copolymer of N-vinyl-N-methyl-acetamide (91.5 weight %) and 2-ethylhexyl acrylate (8.5 weight %), 1.1 part by weight of polyethylene sulfonate and 0.5 part by weight of potassium peroxy disulfate, with an addition of 10,700 parts by weight of styrene and the quantity of peroxy-carboxylic acid ester of formula 1 corresponding to 0.028 % of active oxygen. The mixture was polymerized for two hours at 100° C, two hours at 110° C, 2 hours at 120° C and 2 hours at 130° C.

Subsequently, the product was cooled, worked up and granulated. Test specimens were prepared at 240° C, the $a_k$-values were determined at 0° C according to German Industrial Standard (=DIN) 13 453 and the elongation at break according to DIN 53 455.

| Example | $R_1$ | $R_2$ | $a_k$ [Kp.cm. cm$^{-2}$] | elongation at break [%] |
|---|---|---|---|---|
| 1 | Isopropyl- | t-Butyl | 7,8 | 28 |
| 2 | Cetyl- | " | 8,3 | 49 |
| 3 | Octadecyl- | " | 8,0 | 62 |

Examples 2 and 3 are according to the invention.

We claim:

1. A two-step process for preparing impact resistant vinyl aromatic graft copolymers having an improved notched impact strength and resistance to atmospheric corrosion which comprises as a first step mass polymerizing a reaction mixture of one or more vinyl aromatic monomers in the presence of an ethylene/propylene/-tercomponent rubber at a pressure of 0.05 to 10 atmospheres gauge and in the presence of oxygen and as a second step suspension polymerizing said reaction mixture in the presence of a peroxy carboxylic acid ester having the formula $$R_1-O-\underset{\underset{O}{\|}}{C}-OO-R_2$$

wherein $R_1$ is selected from straight-chain and branched alkyl radicals of 6 to 20 carbon atoms, alkenyl radicals of 6 to 20 carbon atoms, aralkyl radicals of 7 to 12 carbon atoms and cycloalkyl radicals of 5 to 10 carbon atoms and which may be alkyl-substituted and $R_2$ is selected from alkyl radicals of 4 to 12 carbon atoms and aralkyl radicals of 7 to 12 carbon atoms.

2. A process according to claim 1 and wherein $R_1$ is selected from alkyl radicals having 6 to 10 carbon atoms, alkenyl radicals having 6 to 10 carbon atoms, aralkyl radicals of 7 to 12 carbon atoms, and cycloalkyl radicals of 5 to 10 carbon atoms, and $R_2$ is selected from alkyl radicals of 4 to 8 carbon atoms and aralkyl radicals of 7 to 12 carbon atoms.

3. A process according to claim 1 and wherein $R_1$ is a cyclohexyl radical and $R_2$ is selected from tertiary butyl and cumyl radicals.

4. A process according to claim 1 wherein the peroxy carboxylic acid ester is formed in situ from two substances having the formulas $$R_1-O-\underset{\underset{O}{\|}}{C}-Cl$$

and $$R_2OOH$$

wherein $R_1$ and $R_2$ are defined as in claim 1, in the presence of a basic compound and in the polymerization medium during polymerization.

* * * * *